United States Patent [19]

Frick et al.

[11] 4,393,570
[45] Jul. 19, 1983

[54] METHOD OF AND APPARATUS FOR CUTTING STRIPS FROM LONG PLATES

[75] Inventors: Georg Frick, Günzburg; Harro Reiff, Leipheim; Alois Kirsch, Günzburg, all of Fed. Rep. of Germany

[73] Assignee: Karl Mengele & Söhne Maschinenfabrik und Eissengiesserei GmbH & Co., Gunzburg, Fed. Rep. of Germany

[21] Appl. No.: 215,643

[22] Filed: Dec. 12, 1980

[30] Foreign Application Priority Data

Dec. 15, 1979 [DE] Fed. Rep. of Germany ....... 2950555

[51] Int. Cl.³ .................. B26D 11/00; B23D 15/04
[52] U.S. Cl. ........................... 29/560; 29/566.1;
    83/49; 83/167; 83/168; 83/558; 83/560
[58] Field of Search ............... 29/560, 566.1; 409/138,
    409/201; 266/48, 51, 73; 83/556, 558, 56, 562,
    614, 916, 560, 167, 168, 49

[56] References Cited

U.S. PATENT DOCUMENTS

| 997,686 | 7/1911 | McGarth | 83/558 |
|---|---|---|---|
| 1,050,194 | 1/1913 | Wuggenig | 83/558 |
| 1,617,486 | 2/1927 | Huston | 83/237 X |
| 1,730,474 | 10/1929 | Oller | 83/558 |
| 2,372,784 | 4/1945 | Jansen et al. | 83/562 |
| 3,476,000 | 11/1969 | Wheeler | 83/508 X |
| 3,610,098 | 10/1971 | Walker | 409/201 |
| 4,018,134 | 4/1977 | Linsinger | 409/138 |
| 4,054,072 | 10/1977 | Jagers | 30/371 X |
| 4,266,989 | 5/1981 | Ludwigson | 266/73 |

FOREIGN PATENT DOCUMENTS

| 2748436 | 5/1979 | Fed. Rep. of Germany | 29/560 |
|---|---|---|---|
| 677828 | 8/1979 | U.S.S.R. | 409/138 |

Primary Examiner—James M. Meister
Attorney, Agent, or Firm—Toren, McGeady and Stanger

[57] ABSTRACT

To cut strips in the length direction from long sheet metal plates, a table supports the plate and a cutting device moves along the length of the plate supported on the table for cutting the desired strip in a series of cutting steps. The cutting device includes a bottom cutter and a top cutter with the top cutter being movable toward and away from the bottom cutter for making partial cuts across the length of the plate. The cutting device is moved along the support table in the length direction of the plate. After completing the cutting of a strip, the cutting device can be reversed to cut another strip as it moves in the opposite direction. Movable clamps hold the plate down during the cutting operation. Further, movable members are provided in the support table to support the strip as it is cut in successive steps.

14 Claims, 5 Drawing Figures

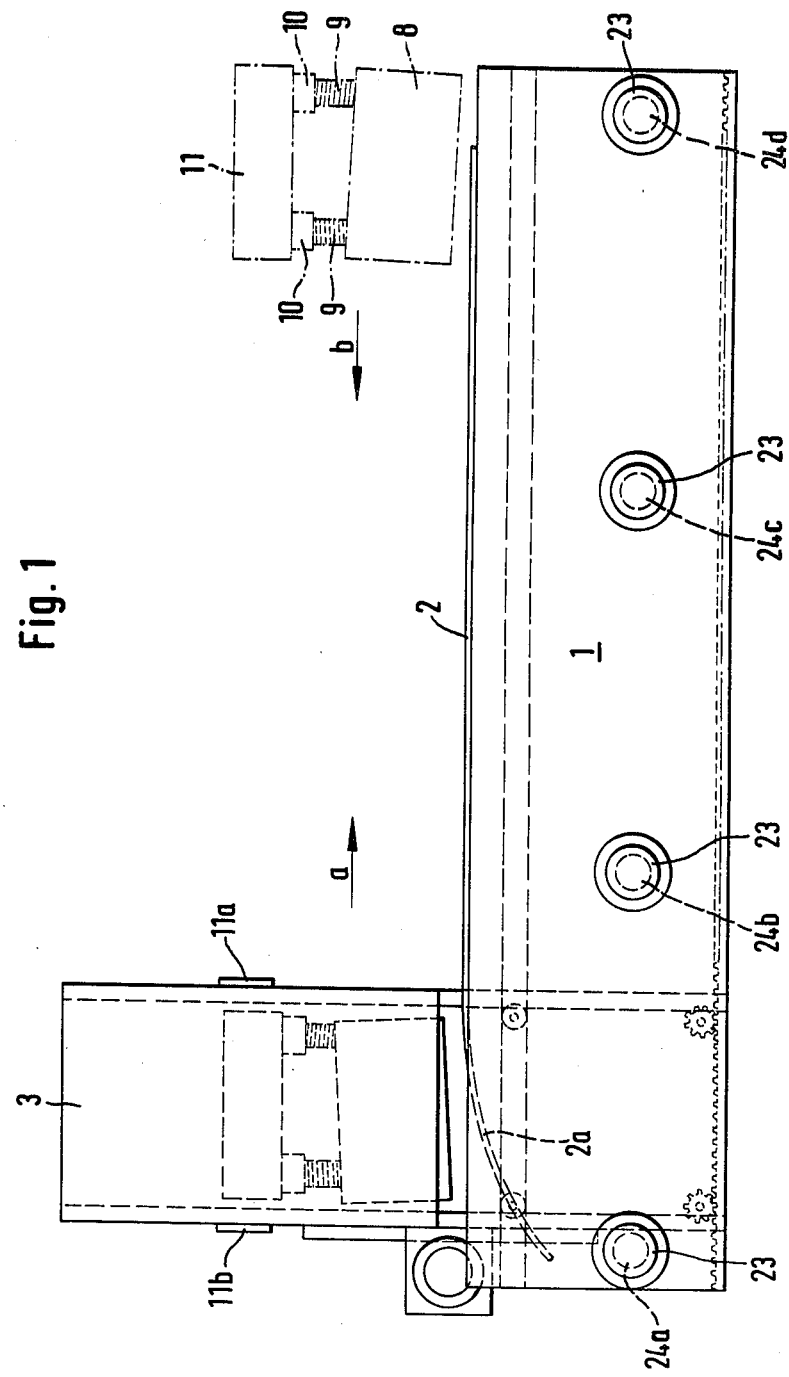

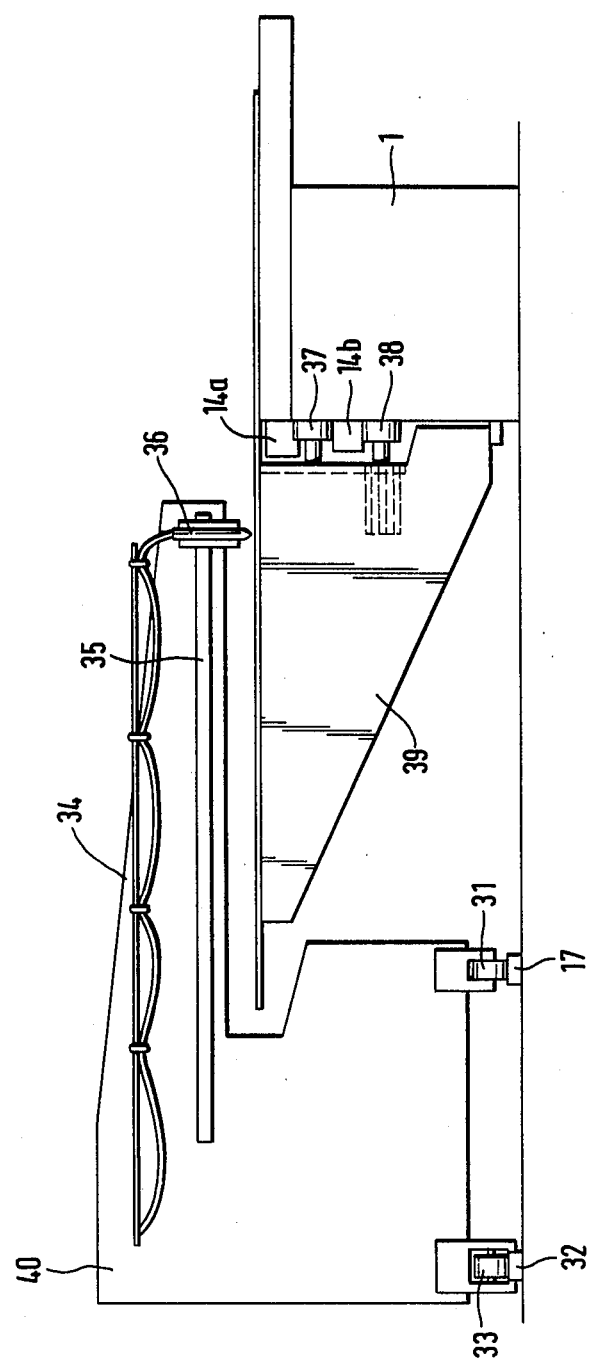

METHOD OF AND APPARATUS FOR CUTTING STRIPS FROM LONG PLATES

SUMMARY OF THE INVENTION

The present invention is directed to a method of and apparatus for cutting strips from long plates, particularly sheet metal plates.

Rotary shears are well known as are the methods involving the use of such shears for cutting plate. In the use of such rotary shears, a rotating circular knife disk is advanced continuously by means of a carriage along the cutting line of the sheet metal plate. Since only large angles between 30 and 60 degrees can be produced with such knife disks, it has been found in practice that the cut strips are deflected greatly downward. As a result the metal strips cut in this manner must be straightened in a very elaborate procedure if they are to be used again.

In plate shears, however, the top cutters can be inclined in a cutting angle of 2-4 degrees and the deflection of the plate is impossible. A disadvantage of plate shears is that they can be produced in a length of about 6 meters with a maximum length of about 8 meters. Even at such lengths, the table and the cutter support are highly stressed in bending and the stress increases with the third power of the length of the cutter. The deflection is further increased by the hold-down clamps required on the table. Compensation of this deflection can be very costly. As a result, using such plate shears it has been necessary to accept the inaccuracy resulting from its use.

The material required for a long plate shears also has a very unfavorable effect on its use. As an example, the weight of a plate shears of 12 meters would be at least double relative to one of 8 meters. As a result, to-date the plate shears which have been used have been limited in length to about 6 to 8 meters. For many purposes, and for continuous operation, much greater table lengths would be advantageous.

Therefore, it is the primary object of the present invention to provide a method of and an apparatus for cutting long plates where the above-described disadvantages are avoided.

In accordance with the present invention, a movable top cutter is provided which is quite short relative to the length of the plate to be cut, and is moved along the cutting line of a fixed plate so that the cutting operation is performed in a number of successive steps until the strip is completely separated from the remainder of the plate.

During the cutting operation, the plate is pressed against a support in the region being cut and then the plate is released as the shears move along the length of the plate. At the same time, the opposite edge of the plate held on the support table is secured against movement. In accordance with the present invention, a plate shears is formed of a top cutter which moves toward and away from a fixed bottom cutter with the bottom cutter being mounted on a shear table forming a part of the stand for the plate shears. The plate shears and stand are moved along a support table which is considerably longer than the length of the top cutter, that is, the top cutter is only a fraction of the overall length of the support table. The plate shears are longitudinally displaceable along the support plate by means of sliding surfaces formed by guide rails on the support table and also on another surface over which the stand for the shears moves. The fixed bottom cutter is secured to the shear table though it could be mounted on the support table. Further, hold down clamps are provided on the shear table for holding the section of the plate being cut and also on the support table for holding the plate during the cutting operation.

With the bottom or fixed cutter mounted on the shear table there is the advantage that the cutting and holding-down forces are absorbed by the shear stand without stressing the guides for the movable plate shears.

With such plate shears the cutting operation is effected in a step-wise manner as the shears are moved along the cutting line of the plate. Initially the shears are moved into the starting position along the support table and the first cutting step is effected by moving the top cutter downward relative to the stationary bottom cutter. With the completion of the partial cut, the top cutter is moved upwardly away from the bottom cutter and then the plate shears are moved a short distance along the support plate, that is, for a distance equal to the length of the top cutter and the next cutting step is carried out. In such an arrangement only minor forces are required for moving the cutting members. With such relatively small length of the plate shears compared to the length of the plate, the weight of the plate shears is kept low and because with such short length the deformation of the plate becomes negligible, accordingly, there is no problem concerning the length of the shears. After each cutting step, the plate shears are moved to cut the next partial length until the plate is completely cut.

With the present invention there is no problem concerning deformation of the separated plate strips, since the cutting is always effected with the same small cutting angle.

Another advantage of the present invention is that existing tables can be lengthened, as required, or the table length can be shortened, if necessary. The plate shears embodying the present invention can be easily adapted to changing needs. As a rule, the plate shears embodying the present invention will be supported by a C-frame with the opening of the frame facing toward the support table.

Another feature of the invention involves the placement of clamps for the plates in grooves on the support table so that the clamps hold the plate being cut along the edge opposite the edge from which the strip is being removed.

To support the partially separated strip as the plate shears is moved along the lenglth of the support table, telescopically arranged brackets are mounted in the support table under the cutting plane.

These brackets can be designed so that they can be pivoted in both directions. The pivotal movement can be controlled or it can be effected by the cooperating action of the shear stand.

To permit continuous cutting of the plate shears in both directions of movement along the support table, a driving element is connected with the cutter carriage by a pair of spindles including spindle nuts with the spindle nuts providing a reversing drive and a plunger arranged to change the position of the cutter as it commences movement in the opposite direction.

In operation, the plunger can be driven by two frame-connected hydraulic cylinder piston units. One of the piston units is designed as a differential cylinder whose upper cylinder is driven by a pump, while the bottom cylinder is in communication, via a variable pressure-oil column, with the upper cylinder of the other cylinder piston unit.

In another advantageous embodiment, it is possible to incorporate a milling head or tool along with the plate shears in the shear stand so that the milling head can be displaced on a carriage toward the cut edge of the plate for machining the edge. Further, the milling head can be arranged to pivot about an axis extending transversely of its feeding direction.

In still another advantageous embodiment, brackets with additional supporting surfaces can be slidably mounted on a guide rail and distributed by means of flexible tension elements interconnecting one another for movement into position along the support table and ensuring a certain interval between them. With this arrangement, a flame cutting device can be displaced between a rest position and a cutting postion relative to the support table. The flame cutting head is displaceable along an arm mounted on the support brackets for movement transverse to the direction of the cutting feed path. The flame cutting device permits larger plates to be divided and then to trim them with the plate shears.

The plate shears and the flame cutting device are movable not only along the guides on the support table but also over guide racks along with the plate shears and flame cutting device move. At least one guide rail can be provided with a driven pinion for moving these devices.

In a further development of the invention, a transverse dividing device is associated with the plate shears. This dividing device can be arranged on the frame supporting the plate shears or it can be moved separately on the support table.

The milling head can be used as the the transverse dividing device as it can be adjusted in the cutting position extending transversely of the cutting line of the plate shears.

The cleaning of the guide rails can be effected by means of grooved brooms or similar devices which can be designed to be driven with the floor drive of the apparatus.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a front view of a plate shears seen from the opposite side of a support table along which the shears moves;

FIG. 5 is a side view of the flame-cutting device illustrated in FIG. 4.

DETAIL DESCRIPTION OF THE INVENTION

Figure 2:
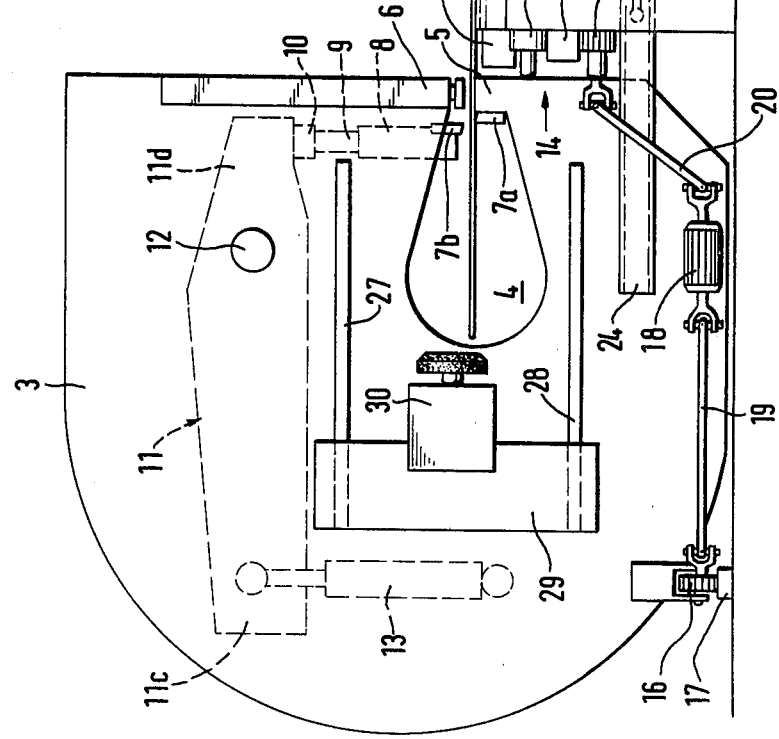
FIG. 2 is a side elevational view of the plate shears shown in FIG. 1.

In FIGS. 1 and 2 a device for shearing elongated strips from a length of metal plate is illustrated and includes a support table 1 on which a sheet of metal plate 2 is positioned. As viewed in FIG. 1 the cutting direction is in the plane of the figure and can be effected in the direction of either of arrows a or b. A C-shaped frame is positioned at the left-hand end of FIG. 1 ready to be moved in the direction of the arrow a for cutting a strip off the length of the plate 2. The C-shaped frame 3 can be best seen in FIG. 2 with the opening 4 formed by the frame facing toward the support table 1. As a part of the shear stand or frame 3, a narrow shear table 5 is arranged at the entrance to the opening 4 in the frame, note FIG. 2, and a hold-down clamp 6 is aligned above the shear table 5. At the side of the shear table 5, spaced more remotely from the support table 1, is a fixed bottom cutter 7a. A movable top cutter 7b which cooperates with the bottom cutter 7a, is arranged on a plunger 8 mounted in the frame 3. Plunger 8 is arranged on a rocker 11 which is adjustable in height by means of a pair of spindles 9 and spindle nuts 10. At the right-hand end of FIG. 1 the plunger 8 which supports the top cutter 76 is shown at the end of the cutting operation ready to be moved in the direction of arrow b to cut another strip from the plate 2. At the right-hand side of FIG. 1 the shear stand or frame 3 is not illustrated.

Side arms 11a, 11b of the rocket 11 are pivotally mounted in joints 12 on the shear frame 3 and are driven by a cylinder-piston unit 13 positioned on the rear crossbeam 11c of the rocker.

As can be seen in FIG. 1, the length of the shears represents only a fraction of the overall length of the support table 1. Running along the entire length of the support table 1 adjacent the shear stand 3 are guide rails 14 on which sliding rollers 15, connected to the shear frame 3, are positioned for movement in the longitudinal direction of the support table. Laterally outwardly from the support table on the lower portion of the shear stand 3 is a pinion 16 on a rail 17 with a guide rack. One of the pinions 16 is driven by a motor 18 via a Cardan shaft 19. Further, motor 18 drives another Cardan shaft 20 which is connected to a pinion 21 in meshed engagement with a guide rack on guide rail 14b. Below the guide rails 14b brackets 24 are telescopically mounted in housings 23 which extend laterally outwardly from the support table on the side away from the shear stand. The brackets 24 can be displaced outwardly from the support table below the plate being cut.

The upper surface of the support table 1 has a number of transverse grooves 25, that is, the grooves extend transversely of the length direction of the support table. Cylinders 26 are mounted in these grooves and are arranged to hold the edges of the sheet metal plate 2 being cut, that is, the opposite edge of the plate from which the strip is being cut by the plate shears 7a, 7b. During the cutting operation, the cylinders 26 hold the plate in position.

Figure 3:
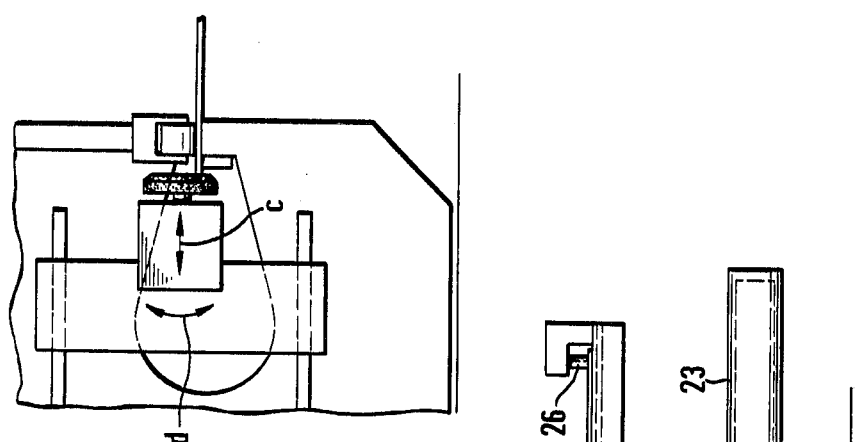
FIG. 3 is a detail view of a portion of the plate shears illustrated in FIG. 2.

As can be seen in FIGS. 2 and 3, a pair of guides 27, 28 disposed in spaced relation to one another, extending transversely of the length direction of the strip being cut, support a carriage 29 on which a milling tool 30 is mounted. As is shown in FIG. 3, the milling tool can be moved in the direction of the arrows c and can also be pivoted in the direction of the arrow d. This milling tool 30 can be used to machine the cut edges of the sheet metal plate 2.

In operation, the plate shears 7a, 7b can move in the direction of the arrows a or b and cut strips from the length of the plate 1. Initially, the plate shears is moved by the pinions 16 and 21 in the rightward direction until the plate shears reaches the position illustrated in phantom in FIG. 1. When the shear stand 3 completes its movement in the direction of arrow a and assumes the position shown in phantom on the right-hand side of FIG. 1, a strip of the plate 1 has been cut and the plate shears are ready to move in the direction of the arrow b to cut another strip 2a.

During the cutting operation, as the plate shears 7a, 7b pass each of the brackets 24a, 24b, 24c, 24d, the brackets extend automatically so that they can support that portion of the plate strip 2a which has been cut. As soon as the plate shears completes its cut, such as when it reaches the right-hand side displayed by the phantom line showing in FIG. 1, plunger 8 with the top cutter 7b is displaced in the opposite inclined position by means of the drive (not shown) of spindles 9 and spindle nuts 10 and, after the plate 2 is moved into the opening 4 in the shear frame 3, another strip is ready to be cut off with the plate shears moving in the direction of the arrow b.

Figure 4:
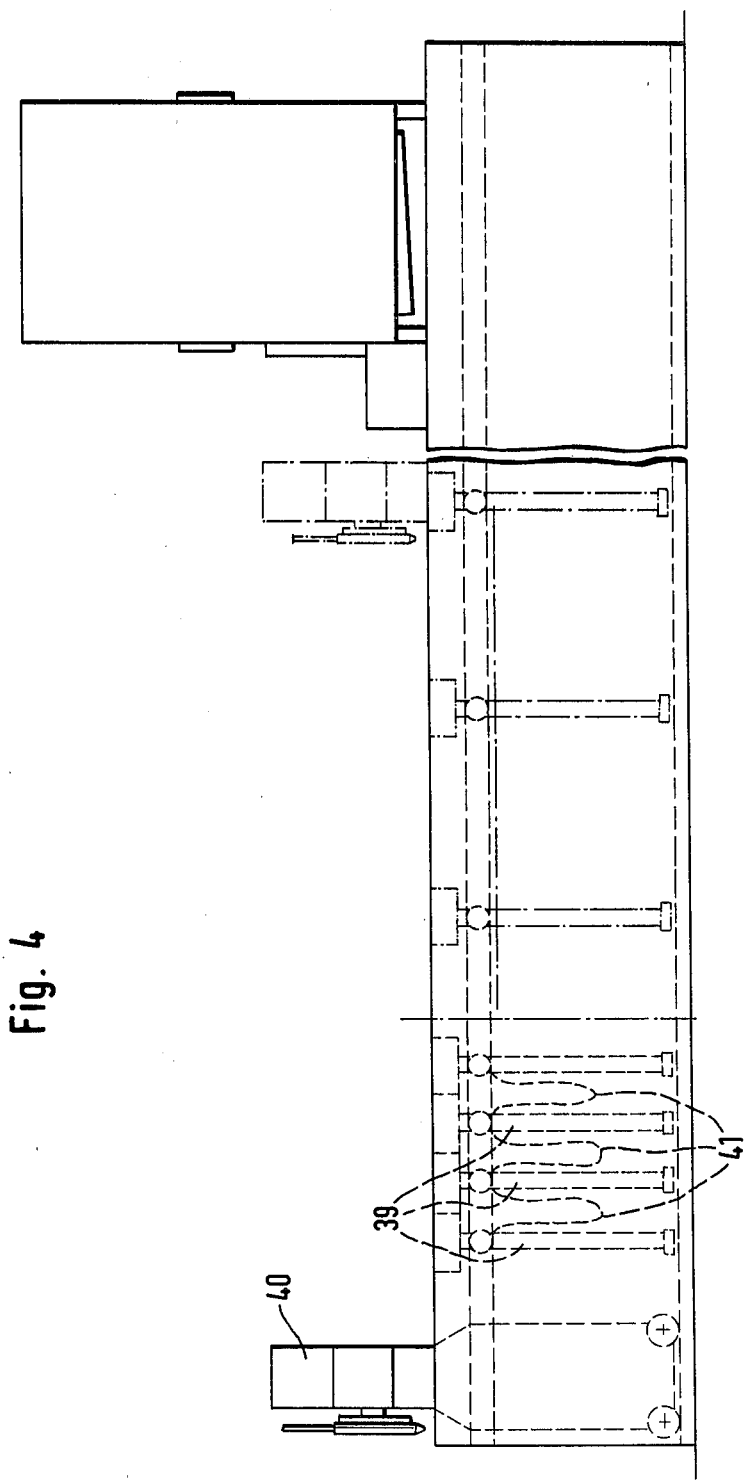
FIG. 4 illustrates the plate shears arrangement as in FIG. 1 with an auxiliary attachment in the form of a flame-cutting device.

As shown in FIGS. 4 and 5, the plate shears of the present invention can be combined advantageously with a flame-cutting device 40 which can be moved on guide rails 17 and 32 via rollers 31, 33. The flame-cutting device 40 can be moved along the length of the support table 1. The device 40 includes a projecting arm 34 on which the cutting torch 36 is mounted on a guide 35. This flame-cutting device 40 serves to precut wider strips of the plate 2. Extending laterally outwardly from the guide rails 14a, 14b are brackets 39 supported on rollers 37, 38. The brackets are connected to one another by tension elements 41, note FIG. 4. In one portion of FIG. 4 the brackets are spaced close to one another, however, in the operating position shown in the right-hand side of FIG. 4 the brackets are spaced apart in the operating position.

The mode of operation of a flame-cutting device is sufficiently well known so that it need not be further described.

While specific embodiments of the invention have been shown and described in detail to illustrate the application of the inventive principles, it will be understood that the invention may be embodied otherwise without departing from such principles.

What is claimed is:

1. Method for cutting strips from long plates such as sheet metal plates including supporting a plate to be cut at a cutting station on an elongated stationary support surface, forming a cutting line along the length of the plate extending along an edge of the support surface, movably positioning a shear stand along the length of the plate in the cutting station adjacent the side of the plate from which a cut strip is to be cut and along the edge of the stationary support surface, providing a movable cutter and a stationary cutter on the shear stand with the movable cutter having a length which is relatively short compared to the length of the support surface so that the length of the support surface is a multiple of the length of the movable cutter, arranging the shear stand at one end of the cutting line and displacing the movable cutter toward the stationary cutter to effect a first cut, moving the movable cutter away from the stationary cutter and then moving the shear stand for the dimension corresponding to the length of the movable cutter for making the next cut, moving the movable cutter toward the stationary cutter to effect a second cut continuing from the first cut and repeating the steps of moving the shear stand and then moving the movable cutter toward the stationary cutter until a length of plate has been completely cut, releasably holding the portion of said plate to be cut adjacent to and outwardly from the edge of the support surface as the movable cutter is moved toward the stationary cutter and releasing the cut portion after the cutting action has been completed, clamping the opposite side of the plate from the side being cut and holding the plate during the continuation of the cutting operation, and supporting the portion of the plate already cut during the continuation of the step-wise cutting operation along the length of the plate to be cut.

2. Plate shears for cutting long plates in the length direction comprising a support table having a length dimension arranged to extend in the length dimension of the plate to be cut, a movable cutter having a length extending in the length dimension of said support table and which is a fraction of the length of said support table, a stationary cutter arranged to cooperate with said movable cutter in cutting the plate, means for supporting said movable cutter and for moving said movable cutter toward and away from said stationary cutter for effecting the cutting operation and for moving said movable cutter step-wise along the length dimension of said support table, hold-down means for securing the plate to be cut in position during the cutting operation, said means for supporting said movable cutter comprises a shear stand extending along the length of said support table, said hold-down means includes a hold-down clamp mounted on said shear stand, a narrow shear table formed on said shear stand aligned opposite said hold-down clamp, and said hold-down clamp being movable into contact with the strip of the plate supported on said narrow shear tables for releasably holding the plate during the cutting operation, and said stationary cutter is mounted on said shear stand adjacent said narrow shear table.

3. Plate shears, as set forth in claim 2, wherein said shear stand is C-shaped in section extending transversely of the length of said support table and said C-shaped shear stand forming an opening facing toward said support table.

4. Plate shears, as set forth in claim 2, wherein said hold-down means includes grooves formed in the surface of said support table on which the plate is supported with said grooves extending transversely of the length direction of said support table, clamping means slidably positionable along said grooves and said clamping means being arranged to secure the plate to be cut on said support table during the cutting operation.

5. Plate shears, as set forth in claim 2, including means for supporting the strip being cut comprising brackets telescopically mounted in said support table for selective displacement outwardly from said support table under the strip of metal being cut for supporting the strip.

6. Plate shears, as set forth in claim 2, including means for supporting said movable cutter for varying the angle of said movable cutter relative to the plate to be cut, and said shear stand being movable in both directions along said support table.

7. Plate shears, as set forth in claim 2, wherein said means for supporting said movable cutter comprising a plunger mounted in said shear stand, said movable cutter supported on said plunger, a rocker, and adjustable spindles and spindle nuts connecting said plunger to said rocker.

8. Plate shears, as set forth in claim 3, including a milling head mounted on said shear stand and being arranged for machining the cut edge of the plate on said support table, a carriage supporting said milling head for movement toward and away from the cut edge of the plate and said milling head being movable in the direction transverse to the length direction of said support table and being pivotally mounted for pivotal movement about an axis extending parallel with the length direction of said support table.

9. Plate shears, as set forth in claim 2, including a flame-cutting device, means for movably supporting said flame-cutting device for movement along the length of said support table and for movement in the direction transverse of said length direction of said support table for positioning said flame-cutting device for cutting the plate positioned on the support table.

10. Plate shears, as set forth in claim 9 wherein said means for movably supporting said flame-cutting device comprising a plurality of brackets slidably mounted along said support table and arranged to be positioned in spaced relation to one another.

11. Plate shears, as set forth in claim 2, wherein said means for supporting said movable cutter and for moving said movable cutter comprising guide rails extending in the length direction of said support table and spaced laterally outwardly from the side of said support table along which said movable cutter moves, and means engageable with said guide rails for moving said movable cutter along said support table.

12. Plate shears, as set forth in claim 11, wherein a pair of said guide rails extending along said support table, one of said guide rails being arranged to guide said movable cutter and a flame-cutting device arranged to be supported on the pair of said guide rails for movement along said support table.

13. Plate shears, as set forth in claim 11, wherein one of said guide rails including a guide rack, a pinion engageable with said guide rack, and a driving motor for driving said pinion for moving said movable cutter along said support table.

14. Plate shears, as set forth in claim 8, wherein said milling head being mounted for rotation through 90° so that said milling head can be moved transversely of the length direction of said support table for effecting a transverse cut of the plate to be cut.

* * * * *